Sept. 19, 1933.  C. C. H. THOMAS  1,927,075
VIBRATOR IMPLEMENT
Filed May 20, 1930
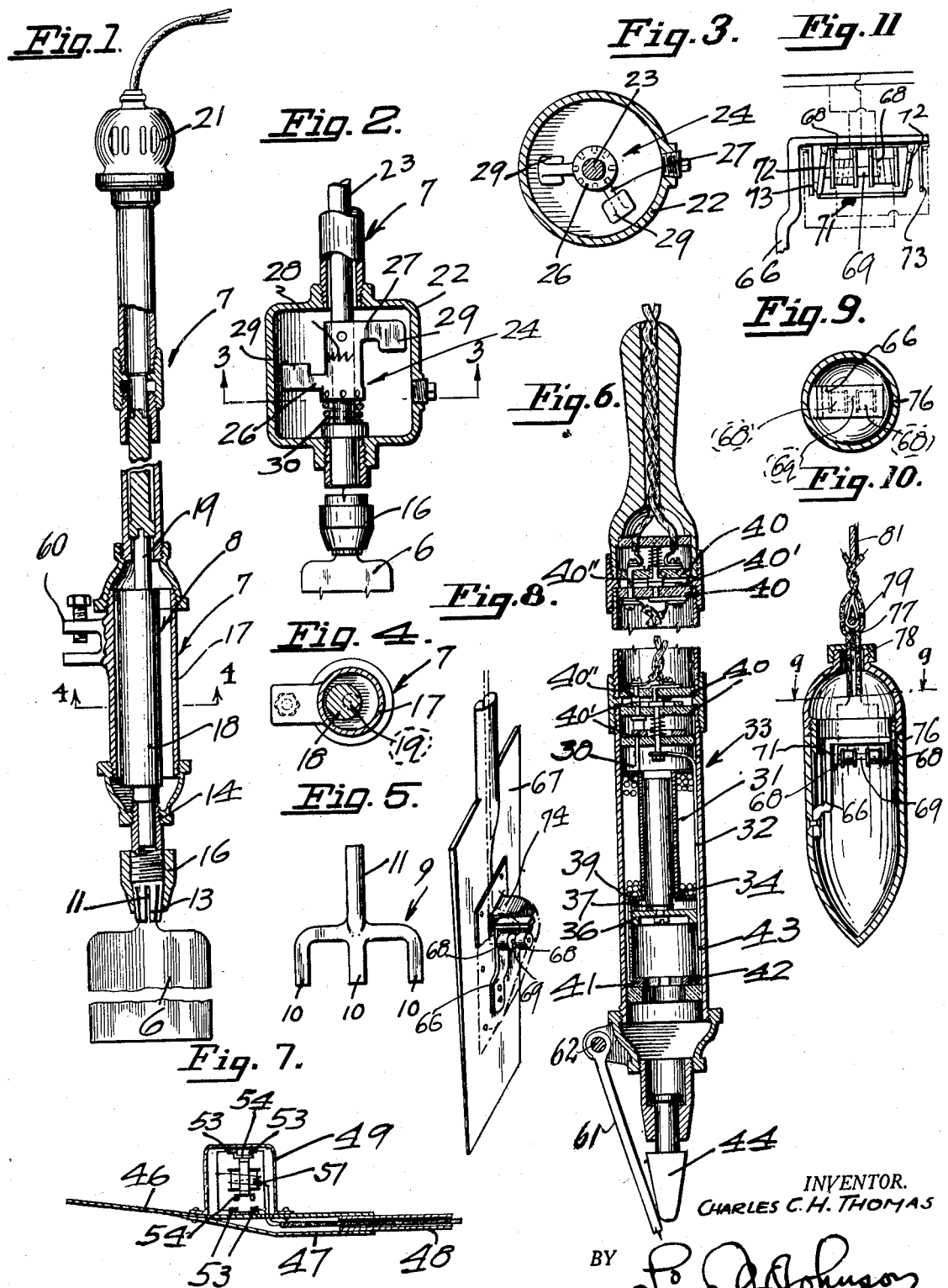
INVENTOR.
CHARLES C. H. THOMAS
BY Lincoln Johnson
ATTORNEY.

UNITED STATES PATENT OFFICE 1,927,075

VIBRATOR IMPLEMENT

Charles C. H. Thomas, Mill Valley, Calif.

Application May 20, 1930. Serial No. 454,000

5 Claims. (Cl. 25—1)

This invention relates to implements for placing, spreading, settling and compacting plastic material, including such substances as concrete, clays and the like.

An object of the invention is the provision of a shovel-like implement by which plastic material may be spread and packed in a mold or form so as to cause uniform settling or flow of the plastic material, by means of the vibration of the instrument, during the spreading and packing.

Another object of the invention is to provide an implement for compacting a plastic material, in which implement a shovel, spear, spade or spreader blade is mounted on a handle-like casing, in which latter a vibrating element is operated in such a manner as to cause the vibration of the instrument, and particularly of the blade, whereby the plastic material is caused to flow or settle evenly and uniformly.

Other objects and advantages are to provide an implement for spreading and packing plastic material, that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawing in which

Fig. 1 is a sectional view of the implement constructed in accordance with my invention;

Fig. 2 is a sectional view of a modified form of the vibrator of the implement;

Fig. 3 is a sectional view of the modified form of the vibrator, the section being taken on the line 3—3 of Fig. 2;

Fig. 4 is a sectional view of the vibrator of the embodiment shown in Fig. 1, the section being taken on the line 4—4 of Fig. 1;

Fig. 5 is a detail view of a modified form of the packing or spreader blade of my implement;

Fig. 6 is a sectional view of another modified embodiment of my invention;

Fig. 7 is a somewhat diagrammatic sectional view of a vibrator structure, in which the vibratory action is transverse to the longitudinal axis of the implement;

Fig. 8 is a perspective view of a spade with a vibrator arranged on the blade of the spade;

Fig. 9 is a sectional view of a vibrator spear, the section being taken on the line 9—9 of Fig. 10;

Fig. 10 is a vertical sectional view of a vibrator spear; and

Fig. 11 is a diagrammatic view of the vibrating mechanism used on the spade and on the spear.

In its general organization, my invention comprises a spade, shovel or spreader blade 6, a handle 7 therefor, and a vibrator mechanism 8 on the handle 7.

The shoveling or spreader blade 6 may be a straight, solid blade as shown in Fig. 1, or it may be formed in the shape of a fork 9, with comparatively wide, flat branches 10. The blade has a shank 11 thereon for attachment to the handle 7.

The blade 6 is held in a grip member 12, an end of which is split as at 13, the other end thereof being threaded for engagement with the lower end of the handle 7 as at 14. The member 12 is also threaded intermediate its ends, for engagement with a nut 16, whereby the split end 13 is pressed upon the blade shank 11 so as to tighly grip the same.

The handle 7 is a sectional, tubular handle, the different sections of which may be replaced by similar sections of different length suitable for various conditions. An intermediate section 17 of the handle is of larger diameter than the other sections so as to accommodate an eccentric rotor 18 of the vibrator therein, which latter is supported on a sectional shaft 19. The shaft 19 is journaled at different points of the handle 7 and at the opposite extreme ends thereof. The upper end of the shaft 19 is suitably connected to an electric motor or other suitable prime mover.

In operation the implement is held by the handle 7 and moved like a shovel, so that the blade 6 spreads and flows the plastic material. The implement is handled the same way as the usual shovel-like implements that are commonly used to shovel, place, spread and pack plastic material, such as concrete, in slabs, molds or forms. The implement constructed in accordance with my invention is moved easily in the plastic material, and due to its vibration, it causes a uniform packing and settling of the plastic material.

When the implement is used as a spade or tamper and is held against the form or mold or between the plastic or concrete and form or mold, the pressure of the plastic against one face will force the other against the form, thus shaking in a horizontal plane both the concrete mass and the form or mold. The vibration set up in the form and spade is transmitted to the plastic causing it to flow, settle and/or compact. When it is to be used to shake the mold, a clamp 60 (Fig. 1) to be secured to the mold is provided. The horizontal motion imparted will not lift molds or forms from the base.

While the general organization of my invention includes a vibrator, yet my invention is not limited to the form of vibrator shown in Fig. 1. Various vibrator constructions may be employed in connection with my implement. Such a modified vibrator is illustrated in Figs. 2 and 3. In this embodiment the handle 7 has an enlarged housing 22 intermediate its ends, a shaft 23 extends thru the handle 7 and housing 22, and is disposed preferably coaxially therewith. The shaft 23 is rotated by a suitable prime mover such as an electric motor 21. Within the housing 22 a rotor 24 for producing vibration is mounted on the shaft 23. The rotor consists of a pair of complementary parts 26 and 27, each of which have the matching faces thereof serrated or notched as at 28. Each of the rotor parts are provided with weights 29 disposed on the outer or peripheral ends thereof. The rotor part 27 is keyed or otherwise fixedly secured to the motor shaft 23, and the rotor part 26 is movable on the shaft 23, whereby said movable rotor part 26 may be placed in any desired position of engagement with the immovable rotor part 27. A compression spring 30 is coiled around the shaft 23 between the movable rotor part 26 and the housing 22 to hold the movable rotor part 26 in engagement with the immovable rotor part 27. By placing the rotor parts 26 and 27 with the weights on said parts diametrically opposite, or 180° apart, the shaft 23 will be balanced. Any position of the weights 29 on the rotor other than when the said weights are diametrically opposite, will cause an unbalanced condition of the shaft 23 and set up a vibration or orbitory movement of said shaft 23, as the shaft 23 is rotated. The construction of the separable rotor 24 hereinbefore described, permits any selected degree of balance or unbalance of the vibrator shaft 23 to be obtained.

The vibration of the implement may be also accomplished by a reciprocative vibrator, such as shown in Fig. 6, wherein a solenoid 31 is fixedly secured into an intermediate section 32 of the implement handle 33. In the solenoid 31 is reciprocable a plunger 34, one end of which has an annular conductive disc 36 thereon. The disc 36 is insulated from the plunger 34 by an insulating washer 37 secured between the disc and the plunger. Vibration is achieved by the intermittent energization of the solenoid 31, and the intermittent energization in turn is accomplished by the making and breaking of the solenoid circuit by the disc 36. A terminal 38 of the solenoid 31 is connected into an electric circuit. The other terminal 39 of the solenoid however, is connected to a semi-circular conductor segment 41, secured in the handle section 32, and is spaced from the lower end of the solenoid 31. A second semi-circular conductor segment 42, complemental to the segment 41, is secured in the handle section 32, so that the segments 41 and 42 are in the same horizontal plane. The segments 41 and 42 are insulated from each other and from the handle 33. An electrical conduit 43 connects the second segment 42 to the source of electricity. Inasmuch as the segments 41 and 42 are separated from each other there is no current flowing thru the solenoid 31, except when the disc 36 rests upon the segments, thereby bridging the same.

In operation the plunger 34 drops by gravity upon the annular seat formed by the segments 41 and 42, the disc 36 at this time contacts with both segments and closes the electric circuit of the solenoid 31. Thus the solenoid is energized and draws the plunger 34 and the disc 36 therewith away from the segments 41 and 42, the solenoid circuit is opened, and the solenoid is demagnetized, whereupon the plunger and the disc drop onto the segments, closing again the solenoid circuit. In this manner the plunger 34 is reciprocated, and at each down stroke the impact thereof with the segments, causes a vibration, which is further enhanced by the vibration set up by the repeated reciprocating movement of the plunger 34.

In order to allow the use of a sectional handle, without using electric wires of undue length, contact devices are used at the joints of the handle sections. Each contact device comprises spaced insulating discs 40. The lower disc 40 has a contact ring 40' on the upper surface thereof thru which one of the solenoid terminals is connected to the circuit. The upper disc 40 has a contact 40'' extending downwardly therefrom, contacting with the ring 40'. The contact 40'' in turn is connected thru a conduit to the source of electricity. The extension of the conduit 43 extends thru the center of the discs 40, insulated from the ring 40'. The respective terminal parts of the contact devices are suitably connected to each other by short wires. Thus any number of sections may be added to or removed from the handle 33, without disturbing the existing solenoid connections below the respective section.

It is to be noted that the blade 44 in this illustration is mounted with freedom of a limited play, increasing the efficiency of the blade action. I have indicated a shovel-like blade 61 attached at 62 to the side of the handle 33 (Fig. 6), which blade 61 extends down to a point of approximate contact with the tamper blade 44, to receive vibratory movement therefrom and to transmit said vibratory movement to the material to be tamped or packed. In some instances it is desirable to have a vibrating effect transversely to the longitudinal axis of the implement, and to impart such vibration to the spreader blade itself. This is accomplished by the structure illustrated in Fig. 7. The blade 46 of this embodiment is made longer and is provided with a reinforcing plate 47. Both the blade 46 and plate 47 are fixedly secured to the end of a preferably tubular handle 48. On one side of the blade 46 and extending at right angles to the plane thereof is secured a housing 49, in which is mounted a solenoid 51. Thru the solenoid is reciprocable a plunger 52. Opposite each end of the plunger 52 are two contacts 53 insulated from each other. The plunger 52 has connector contacts 54 thereon, insulated from the body of the plunger 52, and adapted to bridge the contacts 53. At each end of the plunger stroke the solenoid circuit is closed and the solenoid is energized, drawing the plunger 52 thereinto and away from one set of contacts 53, toward the other. At the end of the stroke, the plunger is drawn again by the energized solenoid in the opposite direction. The reciprocation of the plunger 52 imparts a vibration directly to the blade 46.

It will be recognized that a particularly efficient implement is provided to effect the even packing and settling of a plastic material within any mold; the use of this implement is greatly facilitated by the continuous vibration thereof, and it results in uniformly packed plastic material, which, when settled, will be of equal density throughout. The implement is simple in construction and positive in operation; the vibration thereof is not manual but it is automatic; it does not require any careful setting up or adjustment, nor particular skill in use, therefore it readily lends itself to effective application by the labor ordinarily available.

Another embodiment of the invention is illustrated in Fig. 8, wherein a rigid bracket 66 is fixed at an end thereof, to a face of a spade 67. On the bracket 66 is mounted a pair of axially aligned and spaced solenoids 68, in which is reciprocated an armature plunger 69. The alternate magnetizing of the solenoids 68 draws the plunger 69 successively in opposite directions, thereby exerting a vibratory force at right angles to the plane of the spade 67. The making and breaking of the solenoid circuits is accomplished by circuit breakers actuated by the ends of the plunger 69 at the respective ends of its stroke. For the purpose of illustration, a swinging double contact 71 is shown in Fig. 11. The contact 71 is mounted on the bracket 66 so that the opposite arms 72 thereof are in operative relation to the respective ends of the plunger 69. To move both arms 72 simultaneously, each arm is pivoted at one end thereof, and the free ends of the arms 72 are connected to each other to move together. A fixed contact 73 is arranged opposite each arm 72, with which the respective arms 72 contact when swung thereagainst by the action of the plunger 69. When one of the circuit breaker arms is in closed position, the other is opened and vice versa. The arm 72 on one side is connected to the solenoid on the farther side from said contact, so that when the plunger 69 is in an extreme position it causes the closing of the circuit of the solenoid 68 from which the plunger was drawn out, thereby magnetizing the same and drawing the plunger back into the said solenoid. As the plunger 69 reaches the other end of its stroke, it again operates the circuit breaker in the opposite direction. One end of the coil of each solenoid 68 is connected directly to a source of electricity, and the other end of each coil is connected to the arm 72 at the farther end of the device from said coil.

The repeated reciprocation of the plunger 69 results in the desired vibration of the spade or spear on which the bracket 66 is mounted.

A cover 74 is mounted on the face of the spade 67 to extend over the said vibrating mechanism to protect the same. The cover 74 is of a stream line shape as shown in Fig. 8, to lessen the resistance thereof against movement into and out of the plastic material handled.

In Figs. 10 and 11, a spear is shown, which consists of a pointed, substantially cylindrical, hollow shell 76, made in sections threadedly secured to each other. Within the shell 76 is mounted the bracket 66 and a transversely vibrating mechanism similar to the one described in connection with the spade 67. Electricity is conducted to this vibrating mechanism thru wires 77 which extend thru a cap 78 on the top of the shell 76. On the cap 78 is a hook 79 to be engaged by a cable 81 or other flexible connection, whereby the shell 76 may be lowered onto or into the plastic material or raised therefrom. The shell 76 is tapered at both top and bottom to permit easy entry or withdrawal from the plastic material.

Both of the last mentioned tools are to be inserted into the plastic mass, so that the vibrating mechanism is below the level of the plastic mass to effectively vibrate the plastic material therearound.

Both of the last mentioned tools are used particularly in settling concrete which is being placed in forms or molds to form columns and piles, and also in lowering into wells for the purpose of settling the cement which is being used to seal the bottom of the well.

Both of the last mentioned tools are to be lowered to the surface of the plastic material and during the pouring operation are submerged so that the vibrating mechanism is below the level of the plastic mass. The vibrating mechanism is withdrawn as the mold or form is filled and is kept in proximity of the surface and in contact with the material during the operation. A batch of concrete may be poured into the column and completely submerge the tool, which may then be drawn to the surface, ready for the next batch to be poured, and so on until the form is filled.

It will be seen from my description that I have developed a novel and important method of consolidating the concrete within a mass of concrete. This is particularly important in deep forms where the ordinary methods will not suffice. Usually it is necessary to rely on topping of forms or "rodding." The former is seldom found feasible due to inaccessibility to the forms and the latter a hit or miss procedure at best. It is the usual practice to "rod" or "spade" only that part coming in contact with the forms. The idea being to bring the neat grout to the surface and make it appear to best advantage when the forms are removed. Inasmuch as this outside is often merely fireproofing and does not enter into the actual load bearing part of the mass, this is particularly the case in reinforced columns, etc. It is far more important from a structural standpoint to see that the interior is also properly manipulated and gets its proper share of the rich cementitious mix.

By placing my submergible vibrating spear at the bottom of such a form and gradually raising it as material is poured, I gain great density and strength thereby. The plastic cementitious mix flows down around the sides of the spear and into a compact mass below. The vibration of it and its projecting guards 80, as they pass upward through the mass, cause an even distribution of the grout. The guards prevent fouling the rods and the sides of the forms, yet at the same time by contact therewith, transmit vibrating energy thereto, thus increasing the effectiveness of the tool. The tapering point of the spear when vibrated, causes a powerful downward as well as outward cumulative force to be applied to the material. I have found that after filling column forms and using my apparatus, the material is so densely packed as to make difficult the penetration of a rod more than a very short distance.

Having thus described this invention, what I claim and desire to secure by Letters Patent is:

1. An implement of the character described comprising a hollow handle; a spreader element secured to an end thereof; and a vibrator secured on said element to impart vibration to the said element substantially at right angles to the plane of said element.

2. An implement for use in connection with the molding of plastic materials, comprising a handle, a member on the handle for spreading and packing the plastic material; and means mounted on said member to impart transverse vibration to said member.

3. An implement for use in connection with the molding of plastic materials, comprising a handle, a member on the handle for spreading and packing the plastic material; means mounted on said member to impart transverse vibration to said member, said vibrating means comprising a housing mounted on one side of the blade; a solenoid fixed in said housing; a plunger reciprocable thru the solenoid toward and away from the surface of said member; insulated contacts spaced from the opposite ends of the solenoid and connected to a source of electricity and to said solenoid; and conductive means at each end of said plunger to bridge the respective contacts at the end of each stroke thereby to energize said solenoid; said contacts are so spaced from the ends of the solenoid as to allow the drawing of said plunger away from the respective contacts, when the solenoid is momentarily magnetized.

4. An implement of the character described comprising a spade blade, a casing on a face thereof, and electrically actuated vibratory means in the casing to impart vibration to the spade at right angles to the plane thereof.

5. In a tool for working concrete, a slicing element in the form of a blade, and means for imparting vibratory impulses to said blade in a generally transverse direction only.

CHARLES C. H. THOMAS.